April 25, 1944.   R. A. BROWN ET AL   2,347,170
APPARATUS FOR HOLDING WORK PIECES
Filed June 23, 1941
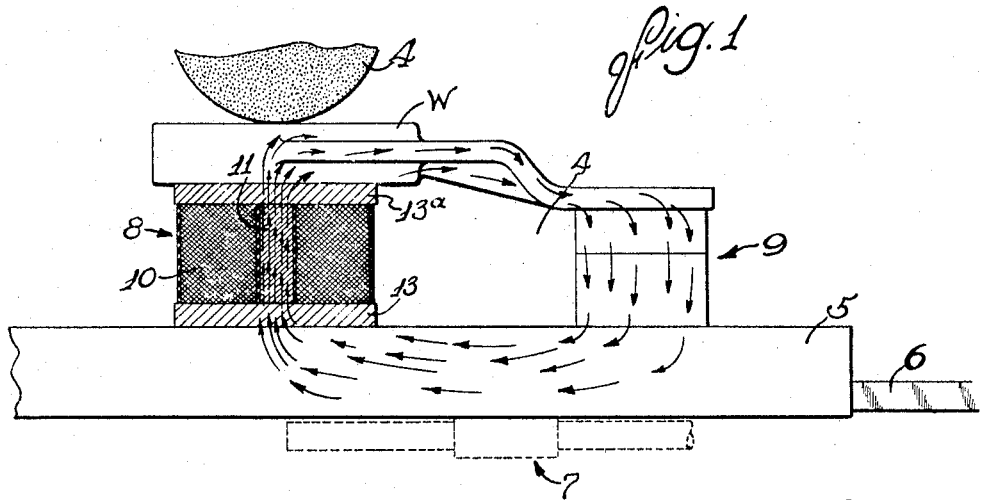
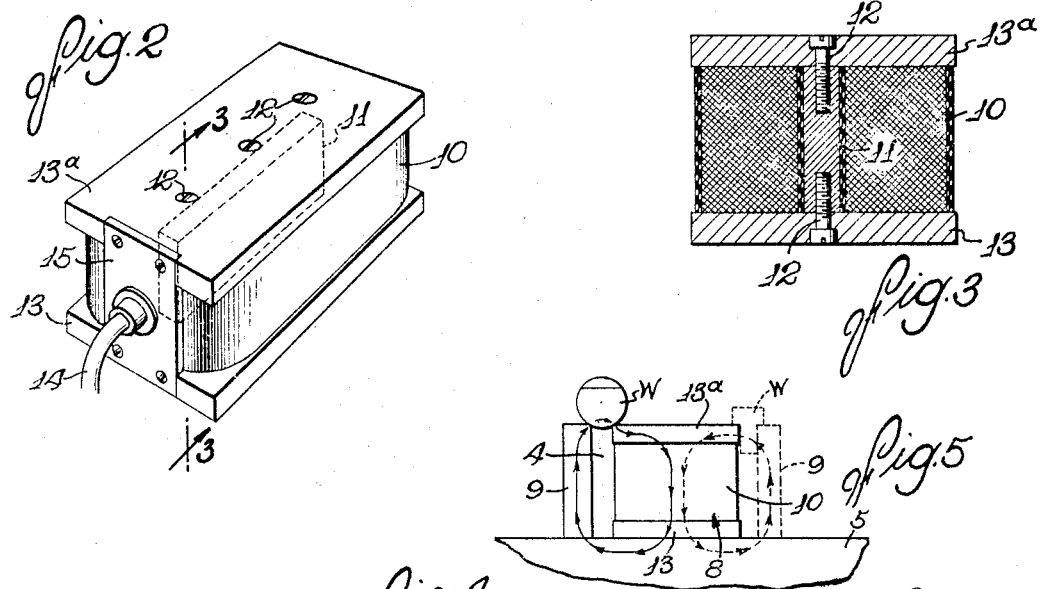
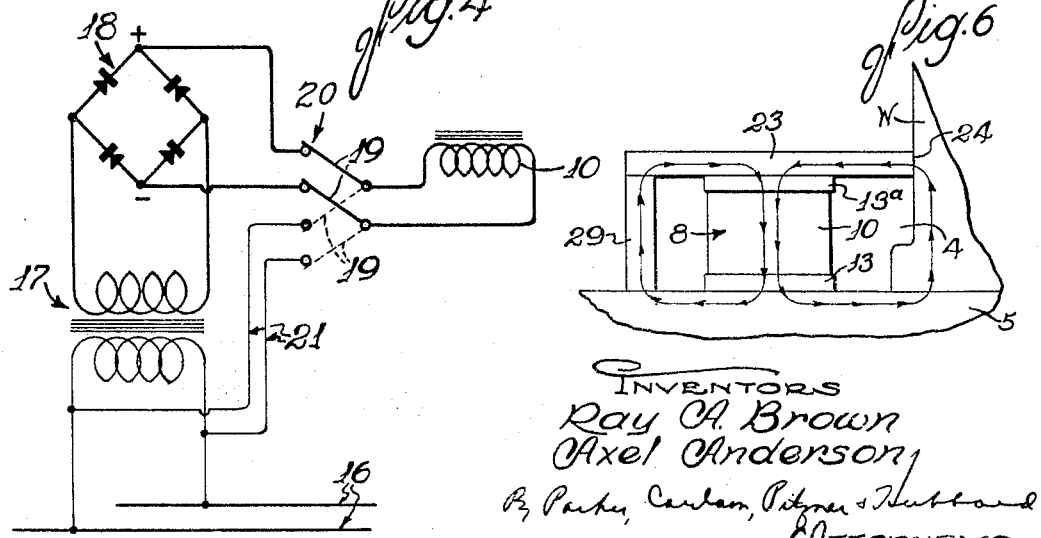
INVENTORS
Ray A. Brown
Axel Anderson
By Parker, Carlson, Pitner & Hubbard
ATTORNEYS Patented Apr. 25, 1944

2,347,170

UNITED STATES PATENT OFFICE 2,347,170

APPARATUS FOR HOLDING WORKPIECES

Ray A. Brown and Axel Anderson, Rockford, Ill.

Application June 23, 1941, Serial No. 399,286

3 Claims. (Cl. 175—367)

This invention relates generally to the magnetic chucking of work pieces composed of magnetic material. The general object is to provide a magnetic chuck which is highly versatile in its adaptability to work pieces of various sizes and shapes and which holds work pieces more effectively than has heretofore been possible.

A more detailed object is to provide a magnetic chuck having a closed magnetic flux circuit encircling a non-magnetic space and including the work piece and its support so that the entire work piece section is available for the flow of flux through it to insure a highly effective holding action on the work.

A further object is to provide a novel apparatus for magnetically chucking a magnetizable work piece to a magnetizable table or other support, which apparatus includes an electromagnet interposed between the table and work and so arranged that when energized it sets up only one polarity in its portions adjacent the work and only an opposite polarity in its portions adjacent the support.

Other objects and advantages of the invention will become apparent from the following detailed description taken in connection with the accompanying drawing, in which Figure 1 is a fragmentary elevational view of a work support equipped with the improved magnetic chuck, part of which is shown in cross-section.

Fig. 2 is a perspective view of the chuck magnet.

Fig. 3 is a section taken along the line 3—3 of Fig. 2.

Fig. 4 is a schematic view and wiring diagram.

Figs. 5 and 6 are views similar to Fig. 1 illustrating the manner of chucking other types of work pieces.

While the invention is susceptible of various modifications and alternative constructions, we have shown in the drawing and will herein describe in detail the preferred embodiment and method. It is to be understood, however, that we do not intend to limit the invention by such disclosure but aim to cover all modifications and alternative constructions falling within the spirit and scope of the invention as expressed in the appended claims.

In the drawing, the improved chuck is utilized to hold a work piece W firmly on a work support such as a table 5 of a machine tool while the work is being operated on as by a cutter 4. The table may be fed along slide ways 6 by suitable mechanism such as a screw and nut 7. As usual, the work table itself is composed of magnetizable material, such as cast iron, and preferably forms a part of a magnetic flux circuit thereby avoiding the necessity of providing a separate supporting base which would have to be clamped to the work table. The flux circuit extends around a high reluctance gap or air space 4 and includes the table and work piece, the full cross-section of which may thus be availed of by the flux threading the circuit. In the form shown in Fig. 1, the flux circuit indicated by the arrows is closed or orbital and is completed through laterally spaced standards 8 and 9 composed of magnetizable material and supporting the work piece above the table in proper spaced relation thereto.

One or both of the standards constitute a magnet core. In this instance, the standard 8 alone is enclosed by a winding 10 wound around a vertical iron plate 11. At opposite edges, this plate abuts against and is secured by screws 12 to two longer plates 13 and 13ᵃ which complete the H-shaped or spool form magnet core and provide parallel bottom and top surfaces that lie flat against the top of the table 5 and the under side of the work piece when the latter is supported in operative position on the standards as shown in Fig. 1. Wires for carrying current to the coil may be enclosed by a cable 14 supported near the coil by a plate 15 fastened to the plates 13 and 13ᵃ.

The other standard 9 simply constitutes a spacer holding the other end of the work at the desired height. It comprises one or more blocks stacked together between the table and a portion of the work spaced from the magnet 8. The upper part of this standard may be specially shaped to accommodate various work contours while maintaining the magnetic circuit closed over an area sufficient to carry the flux required to hold the work piece while being operated on.

The coil 10 is of special design in order that it may be utilized both for chucking and demagnetizing the work piece, thereby avoiding the necessity of providing separate costly demagnetizing equipment. To this end, the coil is constructed to create a magnetic field of the required strength when energized by direct current at one voltage and at the same time is adapted for energization by alternating current at substantially higher voltage to effect demagnetization. Preferably, ordinary 110 volt alternating current source 16 is employed in both instances and the coil has, in this instance, 400 turns of No. 12 copper wire drawing 0.1 of an ampere at 110 volts.

Direct current at six volts, in the present instance, is derived from the source 16 through a step-down transformer 17 whose secondary is connected to the input terminals of a rectifier 18. By moving the arm 19 of a double pole double throw switch 20 to the position shown in full lines in Fig. 4, the rectifier output will be connected to the coil and the latter thus energized to hold the work magnetically. The direct current source is disconnected by moving the arm 19 to neutral position. In the other position of the switch shown in dotted outline in Fig. 4, the coil is connected directly to the 110 voltage source through conductors 21.

The coil 10, although designed for operation at six volts to chuck the work, may safely be subjected to the substantially higher demagnetizing voltage. To this end, the magnet 8 is constructed to possess a substantially high inductance, thereby increasing the impedance when alternating current is employed but being ineffectual in limiting the current drawn when the magnet is energized by the low voltage direct current. The desired inductance is obtained by providing a low reluctance flux circuit and by employing a substantial number of turns in the coil 10. For example, the magnet constructed of 400 turns and with the core plate 11 having a longitudinal section 1 x 5 inches would draw six amperes at six volts direct current and .1 ampere at 110 volts alternating current.

The general method of chucking and dechucking the work piece with the apparatus above described is as follows: The magnet 8 and spacers 9 are placed on the work table far enough apart to accommodate the work piece and avoid any substantial flux leakage. The work piece is thus interposed in the flux circuit through the table, the magnet core, and the spacers as indicated by the arrows in Fig. 1. Thus, the piece will be clamped firmly against the table when the magnet is energized from the direct current source by connecting the rectifier to the coil 10. While thus held, the piece is machined or otherwise operated upon. Thereafter, the piece must be demagnetized. This is accomplished in accordance with the present invention by creating an alternating magnetic flux through the same circuit. For this purpose, the switch 20 is thrown to its other position, thereby connecting the 110 volt alternating current source to the coil. After demagnetization, the switch arm is moved to neutral position and the work piece is removed.

The improved chuck may be used in various other ways for holding other kinds of work pieces during machining. For example, the spacer 9 may be located adjacent the magnet plates so as to contact a work piece at two spaced points or lines as shown in full lines in Fig. 5. Or, as shown in dotted outline, the head or flange of a work piece may rest on the magnet plate and spacer with a portion of the piece disposed between these parts to further increase the effectiveness of the magnet.

In the case of large work pieces, it may be desirable to employ several of the chucks, above described, spaced around the base of the piece mounted on the base or other support 5. For this purpose, the magnet 8 is placed on the table adjacent but spaced from the work piece to provide the air space 4. The flux circuit is completed through a separate plate 23 resting on the top magnet plate 13a with one edge 24 abutting the side of the work piece. Since the flux circuit shown by the arrows is through the work piece and table 5, the two are clamped together effectually. By extending the plate 23 and introducing a spacer 29 between it and the table top, another flux circuit is formed which produces an additional force resisting lateral sliding of the work piece along the table.

It will be observed, from the foregoing, that the present invention involves the use of extremely simple apparatus. The magnet is simple to manufacture at only a fraction of the cost of magnetic chucks now in use. The magnetic flux is utilized efficiently in holding the work piece since it may thread the entire cross-section of the work piece between the two standards 8 and 9. Thus, the total flux is not affected materially by variations in work contour or the height of the supports therefor. Finally, demagnetization of the work piece is effected by the chucking apparatus itself not only eliminating much costly equipment but simplifying the operation by avoiding rehandling and relocating of the work pieces.

We claim as our invention:

1. In an apparatus for magnetically chucking a magnetizable work piece, the combination of a magnetizable support, an electromagnet core structure, structurally separate from said support, and adapted to be positioned at any desired point thereon for interposition between said support and a portion of a magnetizable work piece rested on the core structure, whereby the portion of the work resting on said core structure will be separated from the support by a high reluctance air gap bridged by the core structure, and means for establishing a flow of flux in an orbital path traversing said core structure substantially from end to end and including both the work piece and said support and in which path flows the major portion of the flux passing through said core structure.

2. In an apparatus for magnetically chucking a magnetizable work piece, the combination of a magnetizable work support presenting a generally flat surface of substantial extent, an electromagnet core structure of spool form comprising two spaced end members presenting flat outer faces and joined by a central member extending therebetween, said core structure being positionable at any desired point on the work support's surface with one end member lying against the latter and the other end member exposed for abutment against a portion of a work piece to hold such portion of the work piece spaced from the work support by a high reluctance air gap bridged only by the central member of the core structure, and an energizing winding encircling said central member of the core structure for energizing such structure with opposite polarity for the respective end members, whereby the completion of an orbital low reluctance flux path between the work and support at a point remote from said core structure will compel the flux to pass through substantially all of the portions of the work and support intermediate said remote point and their points of contact with the oppositely polarized end portions of the core structure.

3. Apparatus for magnetically chucking a magnetizable work piece to a magnetizable table or like support, having in combination an electromagnet having a table engaging face and a spaced opposite work piece engaging face as well as an energizable core structure extending between said faces and adapted when energized to set up only one polarity in one face and only an opposite polarity in the other face, and means for completing an orbital path for flux flow directly from the work piece to the table wholly independently of the electromagnet to provide an orbital path which includes the electromagnet only on one side thereof and passes through the body of the work piece and thence directly to the table whereby the electromagnet when energized will simultaneously chuck itself to the table and work piece.

AXEL ANDERSON.
RAY A. BROWN.